United States Patent
Pohlman

(10) Patent No.: US 12,418,729 B2
(45) Date of Patent: Sep. 16, 2025

(54) SYSTEM AND METHOD OF CORRECTING RADIAL COLOR DISTORTION IN AN IMAGE CAPTURED BY AN IMAGE SENSOR THROUGH A TRANSFLECTIVE COATING

(71) Applicant: Gentex Corporation, Zeeland, MI (US)

(72) Inventor: Benjamin N. Pohlman, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 116 days.

(21) Appl. No.: 18/402,192

(22) Filed: Jan. 2, 2024

(65) Prior Publication Data

US 2024/0223916 A1 Jul. 4, 2024

Related U.S. Application Data

(60) Provisional application No. 63/478,402, filed on Jan. 4, 2023.

(51) Int. Cl.
*H04N 23/84* (2023.01)
*B60R 1/04* (2006.01)
*B60R 1/12* (2006.01)
*H04N 25/611* (2023.01)

(52) U.S. Cl.
CPC ............ *H04N 23/84* (2023.01); *B60R 1/04* (2013.01); *B60R 1/12* (2013.01); *H04N 25/611* (2023.01); *B60R 2001/1223* (2013.01)

(58) Field of Classification Search
CPC ........ H04N 23/84; H04N 25/611; B60R 1/04; B60R 1/12; B60R 2001/1223
See application file for complete search history.

(56) References Cited

U.S. PATENT DOCUMENTS

| | | | | |
|---|---|---|---|---|
| 11,639,134 B1* | 5/2023 | Huizen | .................. | B60R 1/088 348/77 |
| 2005/0168614 A1* | 8/2005 | Okada | ................... | H04N 23/68 348/335 |
| 2006/0274170 A1* | 12/2006 | Azuma | ................. | H04N 25/68 348/E5.079 |
| 2009/0040778 A1* | 2/2009 | Takayanagi | ............... | B60R 1/30 362/494 |
| 2023/0254475 A1* | 8/2023 | Kerman | ............... | H04N 25/131 348/164 |
| 2024/0179383 A1 | 5/2024 | Lintz et al. | | |

FOREIGN PATENT DOCUMENTS

| | | |
|---|---|---|
| CN | 111107330 A | 5/2020 |
| CN | 114697483 A | 7/2022 |
| JP | 2011-29858 A | 2/2011 |
| KR | 10-2006-0113811 A | 11/2006 |
| KR | 10-2022-0142205 A | 10/2022 |

\* cited by examiner

*Primary Examiner* — Christopher K Peterson
(74) *Attorney, Agent, or Firm* — Price Heneveld LLP; Brian James Brewer

(57) ABSTRACT

A rearview mirror assembly for a vehicle is provided, including: an electro-optic element having at least one transflective coating; at least one imager comprising an array of pixels and positioned behind the electro-optic element to capture an image through the transflective coating; a processor capable of determining correction data for each pixel as a function of a location of the pixel within the array of pixels; and correcting color values for each pixel of the image captured based on the correction data for that pixel to correct for radial color distortion caused by the transflective coating.

20 Claims, 5 Drawing Sheets

SYSTEM AND METHOD OF CORRECTING RADIAL COLOR DISTORTION IN AN IMAGE CAPTURED BY AN IMAGE SENSOR THROUGH A TRANSFLECTIVE COATING

CROSS-REFERENCE TO RELATED APPLICATION

This application claims priority to and the benefit under 35 U.S.C. § 119(e) of U.S. Provisional Patent Application No. 63/478,402, filed on Jan. 4, 2023, entitled "SYSTEM AND METHOD OF CORRECTING RADIAL COLOR DISTORTION IN AN IMAGE CAPTURED BY AN IMAGE SENSOR THROUGH A TRANSFLECTIVE COATING," the entire disclosure of which is hereby incorporated herein by reference.

TECHNOLOGICAL FIELD

The present invention generally relates to an image sensor for imaging an interior of a vehicle, and more particularly relates to an image sensor capturing images through a transflective coating.

SUMMARY OF THE DISCLOSURE

According to one aspect of the present disclosure, a rearview mirror assembly for a vehicle is provided comprising: an electro-optic element having at least one transflective coating; at least one imager comprising an array of pixels and positioned behind the electro-optic element to capture an image through the transflective coating; a processor capable of determining correction data for each pixel as a function of a location of the pixel within the array of pixels, and correcting color values for each pixel of the image captured based on the correction data for that pixel to correct for radial color distortion caused by the transflective coating.

According to another aspect of the present disclosure, a monitoring system for a vehicle is provided comprising: a transflective coating; at least one imager comprising an array of pixels and positioned behind the transflective coating to capture an image through the transflective coating; a processor capable of determining correction data for each pixel as a function of a location of the pixel within the array of pixels; and correcting color values for each pixel of the image captured based on the correction data for that pixel to correct for radial color distortion caused by the transflective coating.

According to another aspect of the present disclosure, a method is provided for correcting for radial color distortion in an image captured by an imager comprising an array of pixel sensors and positioned behind a transflective coating to capture an image through the transflective coating, the image including a plurality of pixels corresponding to each of the array of pixel sensors, the method is performed by a processor and comprises: receiving the image captured by the imager; determining correction data for each pixel as a function of a location of the corresponding pixel sensor within the array of pixel sensors; and correcting color values for each pixel of the image captured based on the correction data for that pixel to correct for radial color distortion caused by the transflective coating.

These and other features, advantages, and objects of the present invention will be further understood and appreciated by those skilled in the art by reference to the following specification, claims, and appended drawings.

DETAILED DESCRIPTION

Figure 1:
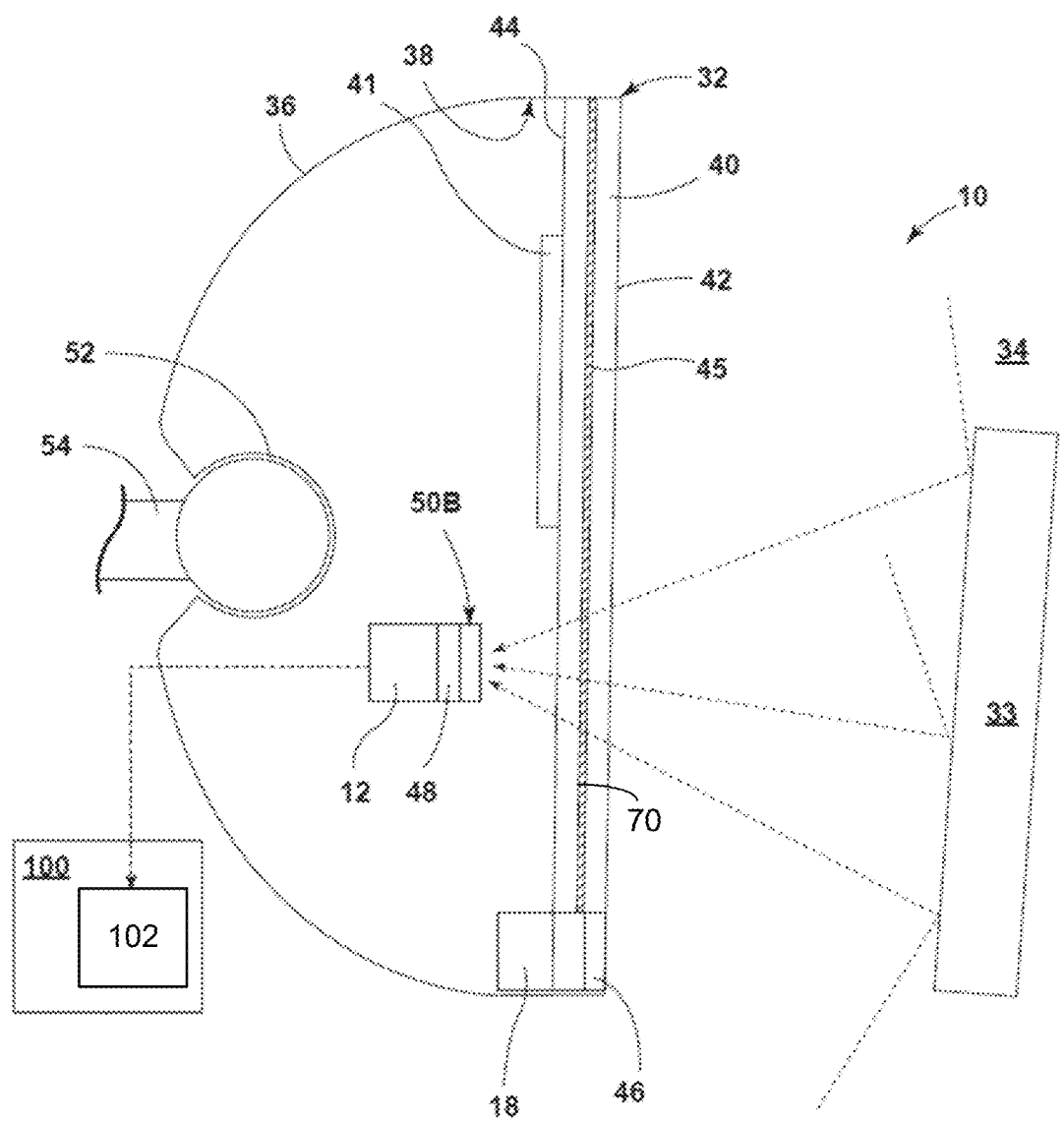
FIG. 1 is a side cross-sectional view of a monitoring system according to an aspect of the present disclosure when implemented in a rearview mirror assembly.

For purposes of description herein, the terms "upper," "lower," "right," "left," "rear," "front," "vertical," "horizontal," and derivatives thereof shall relate to the invention as oriented in FIG. 1. Unless stated otherwise, the term "front" shall refer to the surface of the mirror closer to an intended viewer of the rearview assembly, and the term "rear" shall refer to the surface of the element further from the intended viewer of the rearview assembly. However, it is to be understood that the invention may assume various alternative orientations, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Rearview mirror assemblies are known to include an electro-optic mirror element such as an electrochromic mirror element. It is also known to use a transflective (i.e., a partially reflective, partially transmissive) coating such that light may be transmitted through the mirror element from a display or to a sensor or image sensor. This allows the mirror element to still function as a mirror by reflecting rearward images to the driver, while also obscuring electronic components behind the mirror such as the display, image sensor, or other sensors.

When an image sensor that is provided to capture images of the interior of the vehicle is placed behind the mirror element and its transflective coating, light passing to the image sensor is impacted by the transmission properties of the transflective coating. Further, it may be desirable to have the image sensor capture images in daylight conditions or in nighttime conditions using infrared (IR) radiation. However, there are challenges in utilizing a transflective coating that provides transmission of IR radiation and uniform transmission across the visible spectrum when employing an imager behind the transflective coating. In particular, Applicant has discovered that such transflective coatings may introduce radial color distortion to the image captured by the imager in the visible light spectrum. This radial color distortion is analogous to separate lens vignetting effects being applied to each color channel. The different attenuation on the individual color channels manifests as a color shift. For example, such radial color distortion may cause the image to have a green tone in the middle of the image with a pink ring around the green middle while the outer parts of the image are whiter.

Figure 3:
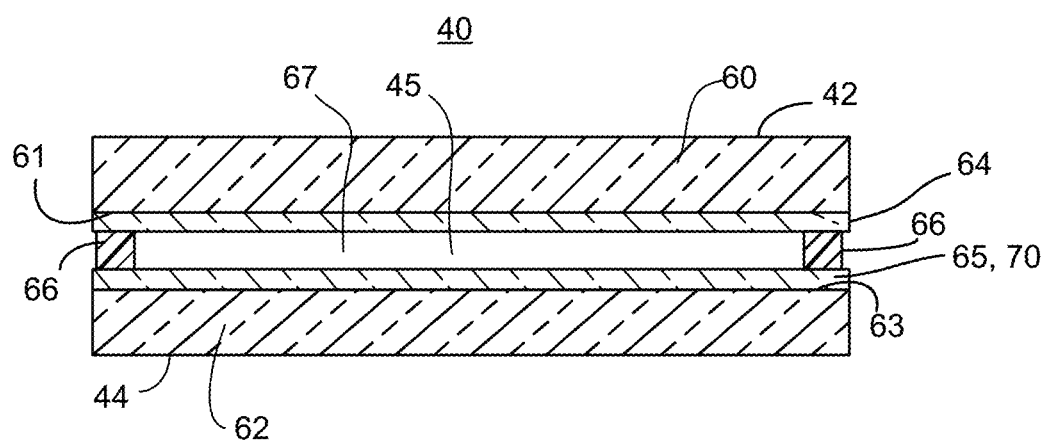
FIG. 3 is a cross-sectional view of an electro-optic mirror element that may be used in the rearview mirror assembly shown in FIG. 1.
Figure 4:
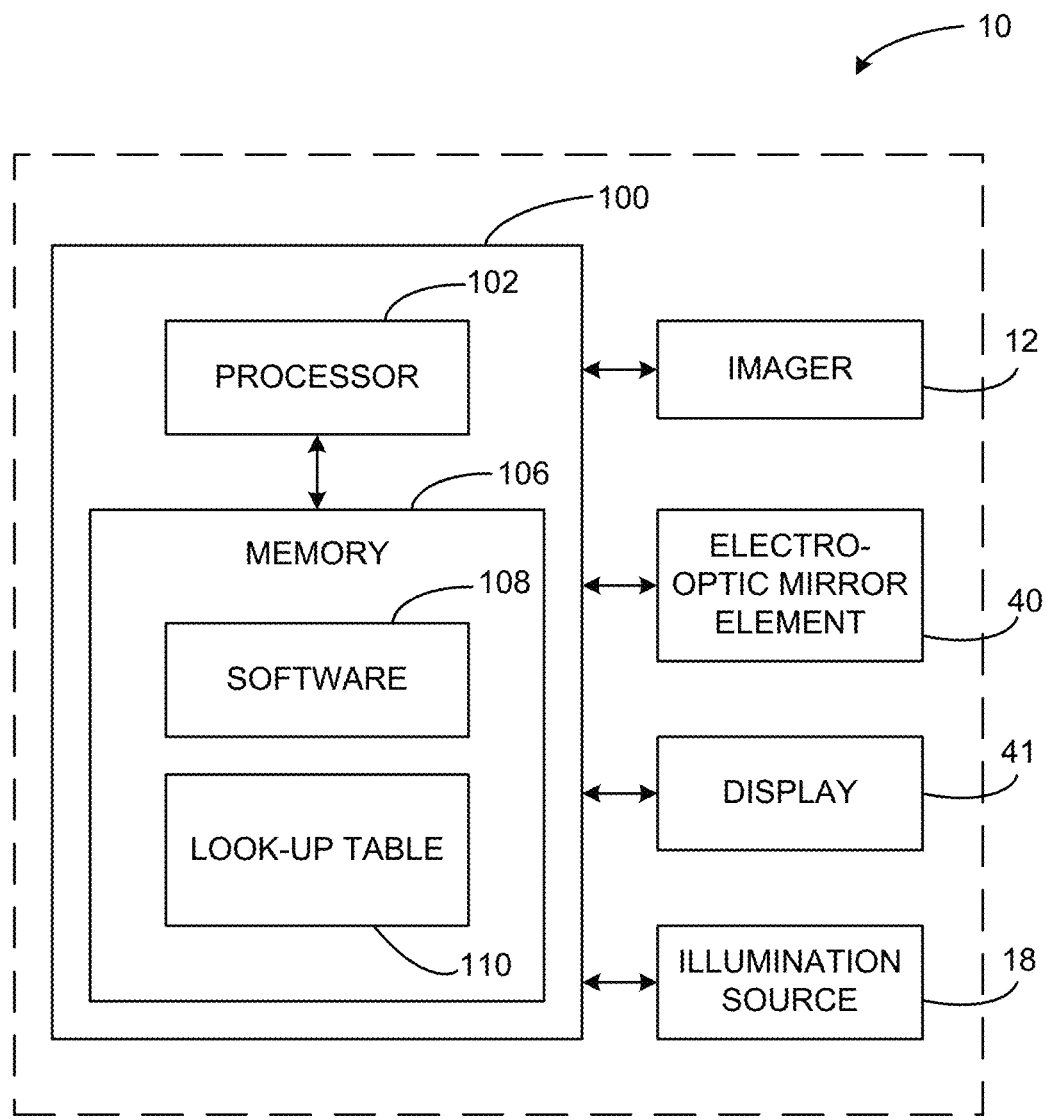
FIG. 4 is an electrical circuit diagram in block form showing the monitoring system shown in FIGS. 1 and 2.

With reference to FIGS. 1, 3, and 4, reference numeral 10 generally indicates a monitoring system for a vehicle 30 that includes at least one imager 12 including an array of pixel sensors and positioned behind a transflective coating 70 to capture an image through the transflective coating 70. The monitoring system 10 further includes a control system 100 having a processor 102 capable of determining correction data for each pixel as a function of a location of the pixel within the array of pixels, and correcting color values for each pixel of the image captured based on the correction data for that pixel to correct for radial color distortion caused by the transflective coating 70.

The processor 102 may correct the distortion by applying a white-balance operation with coefficients that are derived from the transmission properties of the transflective coating 70 and the ray angle (i.e., pixel location) of the incoming light. The white-balance operation is applied as a final step in the image processing (i.e., on the rendered, full color image).

The distortion is modeled as a white-balance shift, whose coefficients for correction are dependent on the location in the imager's pixel sensor array, the transmission properties of the transflective coating 70, the spectrum of the illumination source, and the relative orientation of the glass plane of the rear of a mirror element 40 to the imager plane (as noted below, the transflective coating 70 may be provided by the mirror element 40).

According to a first method, the processor 102 may determine the color correction data for each pixel by accessing a look-up table having correction data for each corresponding pixel sensor in the array of pixel sensors. Such a look-up table may be created by calibration whereby images of a flat, white, well illuminated scene are taken with and without the transflective coating 70. The ratios between each of the color channels between the with- and without-coatings image samples represent the radial color distortion of the coating 70 itself. The correction can then be applied to any subsequent capture of a scene which is illuminated by a source substantially similar to that used for calibration by multiplying this "ratio image" to the uncorrected image.

An alternative second method for deriving the correction is by using a characterized transmission profile of the transflective coating 70, knowledge of the lens and imager system, and location in the imager's pixel sensor array. The transmission profile provides the attenuation of various wavelengths of light (and therefore the red, green, and blue channels) as a function of angle-of-incidence of the incoming light ray to the plane of the transflective coating. Knowledge of the lens and image sensor, namely, optical center and lens distortion parameters, as well as the relative angle of the transflective coating to the image sensor plane, provide information to calculate the angle-of-incidence from a location in the pixel array. A look-up table 110 is then created using this information, with entries of the correction coefficients indexed by the angle-of-incidence. Alternatively, the look-up table could be indexed by the radial distance from the optical center of the image pixel array, with the angle-of-incidence being converted to a radial distance from the optical center during generation of the look-up table. The processor 102 could then implement this method by calculating the angle-of-incidence for each pixel location in the current image, looking up the correction coefficients in a look-up table 110, and applying the correction by multiplying the red, green, and blue coefficients of the correction data with the pixel's red, green, and blue values.

Although white-balance operations are known, typical applications are to correct the color distortion inherent to the characteristics of the imager and/or the color of the light source that illuminates the scene. These approaches do not consider any spatial/structural dependencies, as the nature of these color distortions is uniform across the entire pixel array. For the most part, any additional materials with optical properties placed in front of the imager (i.e., glass covers) are specifically designed not to introduce color distortions, or to at least introduce a spatially uniform distortion.

Whereas the prior white-balance operations do not take into account spatial-dependent color distortions, the monitoring system 10 allows for greater flexibility in the design of coatings, as radial color distortions introduced can be efficiently corrected in the image processing performed by processor 102. This greater flexibility should, at the very least, afford better performing coatings in applications that require simultaneous IR and visible light processing (i.e., in-cabin monitoring products for the automotive market).

The first method of determining the correction data has the advantage of being simple to derive the correction coefficients and simple to look up the coefficients at runtime, but at the cost of a memory-expensive implementation (an entire 3-channel image buffer may be used even with compression techniques, the memory footprint may be significant). The second method has the advantage of using a lower memory footprint; the 3×N look-up table, with N typically equal to 360, is many orders of magnitude smaller than the image buffer. However, this does come at greater computation complexity for the look up as well as a more difficult method to derive the correction coefficients from the transmission profiles.

Figure 2:
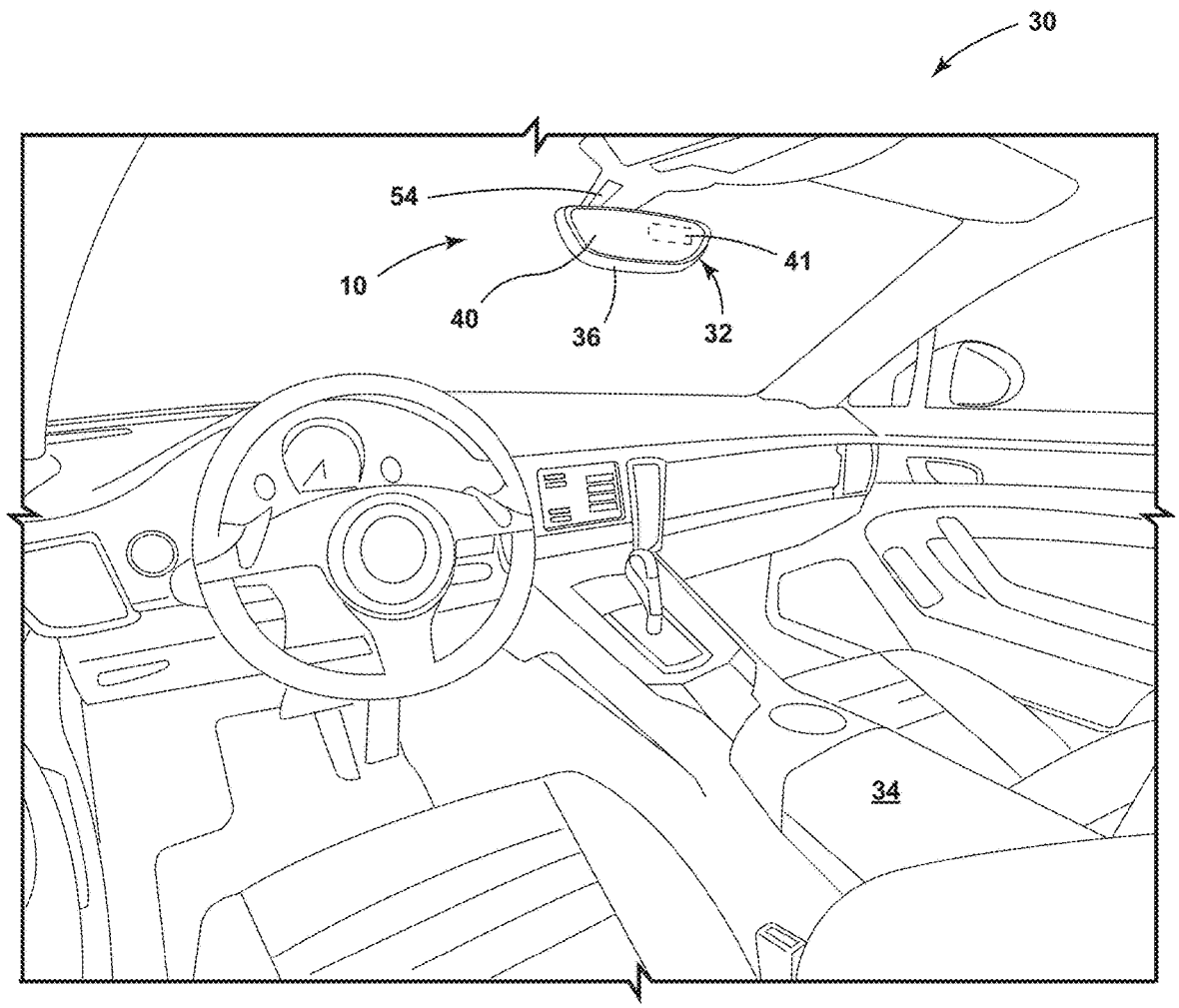
FIG. 2 is a side perspective view of an interior of a vehicle incorporating a monitoring system according to an aspect of the present disclosure.

With reference now to FIGS. 1 and 2, the monitoring system 10 may be incorporated into a variety of structures, such as structures of the vehicle 30. For example, the imaging device 12 may be provided in a rearview mirror assembly 32 for monitoring a position or characteristics of an occupant 33 (e.g., a driver position) in a cabin 34 of the vehicle 30. The rearview mirror assembly 32 may include a mirror element 40 that includes the transflective coating 70. The mirror element 40 may be an electro-optic mirror element having an electro-optic medium 45 such that the mirror element 40 can be switched to change reflectance.

The rearview mirror assembly 32 may include a housing 36 defining an opening 38 in which the mirror element 40 is positioned. The mirror element 40 includes a front surface 42 that faces the occupant 33 and a rear surface 44 that generally faces away from the occupant 33. An optional display device 41 may be located between the housing 36 and the mirror element 40 for displaying information to the driver. The electro-optic mirror element 40 as disclosed herein may be a single-layer, single-phase component, multi-layer component, or multi-phase component. A further description of the electro-optic mirror element 40 is provided below.

The monitoring system 10 may further include an illumination source 18 configured to emit at least one of infrared (IR) or near infrared (NIR) illumination. A transmitting optical element 46 may be fixed relative to the illumination source 18 to collimate and/or diffract the illumination. A receiving optical element 48 may be fixed relative to the imaging device 12 to focus light therein. The housing 36 may include a connection hub 52, and the connection hub 52 may be connected to a mounting member 54. The mounting member 54 is configured to be connected to the vehicle 30 (or other environment), and the housing 36 is moveable relative to the mounting member 54 to orient the mirror element 40 at various angles relative to an occupant 33 (or other environmental position) to obtain different environmental views and/or orientations relative to the driver.

A filter 50B may be fixed relative to the imaging device 12. The filter 50B may be configured to selectively attenuate the transmission of one or more certain wavelength spectrums. For example, the filter 50B may be configured as a dynamic filter, such as a filter incorporating a liquid crystal structure. In this way, the filter 50B may selectively filter light from illumination source 18 and/or ambient light. An example of such a filter is disclosed in U.S. Patent Publication No. 2024/0179383A1, entitled "MONITORING SYSTEM," filed on Nov. 28, 2023, the entire disclosure of which is incorporated herein by reference.

With reference to FIG. 3, the electro-optic mirror element 40 may include a first substrate 60, a second substrate 62, a first electrode 64 provided on a rear surface 61 of the first substrate 60, a second electrode 65 provided on a front surface 63 of the second substrate 62, a seal 66 provided between the substrates to define a sealed chamber 67 therebetween, and the electro-optic medium 45 disposed in the chamber 67 between the first electrode 64 and second electrode 65. In the example shown in FIG. 3, the second electrode 65 may be a coating formed of one or more layers of electrically conductive materials that also have optical properties so as to form the transflective coating 70. In other words, the coating 65, 70 serves as both the transflective coating 70 and the second electrode 65. It is also possible to form a separate transflective coating 70 that underlies a highly transmissive, electrically conductive layer that serves as the second electrode 65. Another possible configuration is to provide the transflective coating 70 on the rear surface 44 of the second substrate 62 while using a transparent electrode layer on the front surface 63 as the second electrode 65.

With reference now to FIG. 4, the control system 100 of the monitoring system 10 may include at least one processor 102. In some embodiments, the at least one processor 102 may include combinations of a processor associated with and controlling the imager 12, a processor associated with and controlling the electro-optic element 40. In some embodiments, however, it should be appreciated that the processor 102 is a processor that issues global instructions to several (e.g., all or select) components of the monitoring system 10. Each processor 102 may include a memory 106. The processor 102 may be any suitable processor. The memory 106 may include instructions that, when executed by the processor 102, cause the processor 102 to, at least, perform the functions associated with the components of the monitoring system 10. The imager 12, the illumination source 18, the electro-optic mirror element 40, and the display 41 may, therefore, be controlled by the control system 100 (e.g., the at least one processor 102 or processors associated therewith). The memory 106 may, therefore, include software 108 and a look-up table 110.

Figure 5:
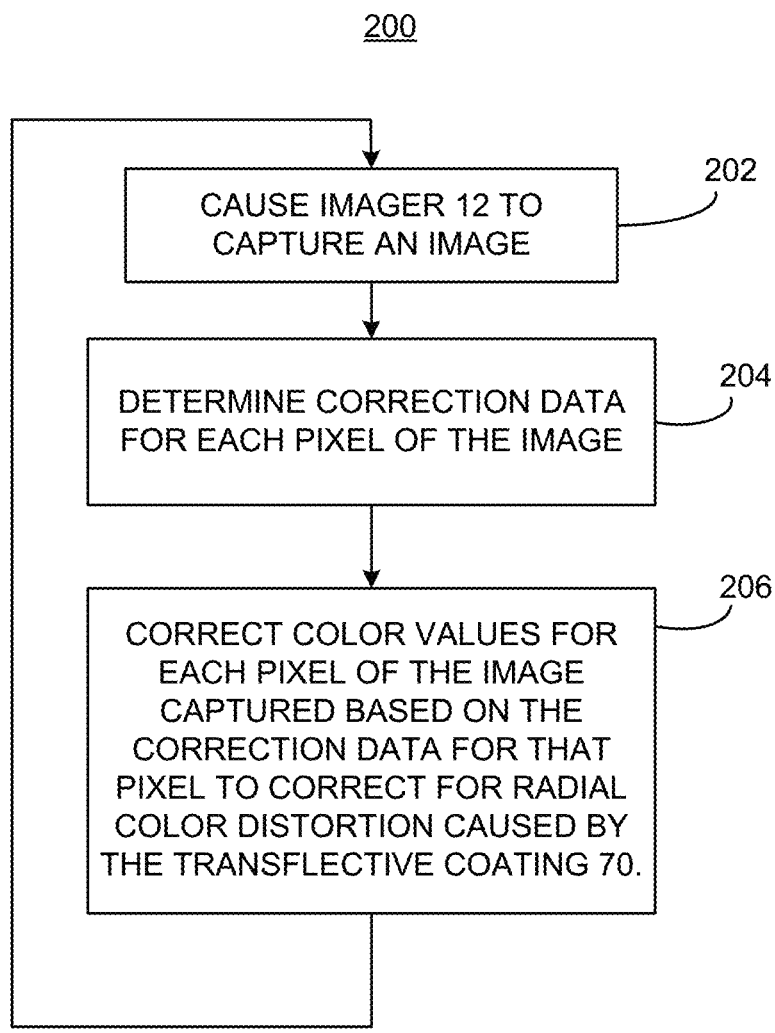
FIG. 5 is a flowchart showing a method performed by the monitoring system shown in FIGS. 1, 2, and 4.

FIG. 5 illustrates an example of a method 200 performed by the processor 102 when receiving images during normal operation. Method 200 is described generally below and encompasses the first and second methods described above. First, the processor 102 controls the imager 12 to capture an image (step 202). Next, the processor 102 may determine correction data for each pixel as a function of a location of the pixel within the array of pixels of the imager 12 (step 204). Then, the processor 102 may correct color values for each pixel of the image captured based on the correction data for that pixel to correct for radial color distortion caused by the transflective coating 70 (step 206). The processor 102 may repeat steps 202-206 until monitoring is no longer required. The correction data for each pixel may be stored in look-up table 110 having correction data for each pixel in the array of pixels pursuant to the first method described above or may be calculated from data contained in look-up table 110 having a lesser amount of data stored therein pursuant to the second method described above.

Although the monitoring system 10 is described as being located in a rearview mirror assembly 32, portions of the system or all of the system may be located elsewhere. Further, although the system 10 is designed to correct radial color distortion caused by the transflective coating 70, it may also correct radial color distortion caused by any other coating (whether additional or alternative to the transflective coating 70) or by any other optical element placed in front of the imager 12.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A rearview mirror assembly for a vehicle, comprising:
   an electro-optic element having at least one transflective coating;
   at least one imager comprising an array of pixel sensors and positioned behind the electro-optic element to capture an image through the transflective coating, the image including a plurality of pixels corresponding to each of the array of pixel sensors;
   a processor capable of:
      receiving the image captured by the imager;
      determining correction data for each pixel as a function of a location of the corresponding pixel sensor within the array of pixel sensors; and
      correcting color values for each pixel of the image captured based on the correction data for that pixel to correct for radial color distortion caused by the transflective coating.

2. The rearview mirror assembly of claim 1, wherein the processor determines the correction data for each pixel by accessing a look-up table.

3. The rearview mirror assembly of claim 2, wherein the look-up table has correction data for each pixel in the array of pixel sensors.

4. The rearview mirror assembly of claim 3, wherein the correction data stored in the look-up table is determined by calibration whereby image samples of a flat, white, well illuminated scene are captured with and without the transflective coating present in front of the imager, ratios between each of the color channels between the with- and without-coatings image samples represent the radial color distortion of the transflective coating itself.

5. The rearview mirror assembly of claim 2, wherein the processor determines the correction data for each pixel by calculating an angle-of-incidence for each pixel location in the captured image and looking up correction coefficients in the look-up table.

6. The rearview mirror assembly of claim 1, wherein the processor correcting color values for each pixel of the image captured by multiplying red, green, and blue coefficients of the correction data with red, green, and blue values of the pixel.

7. A monitoring system for a vehicle, comprising:
   a transflective coating;
   at least one imager comprising an array of pixel sensors and positioned behind the transflective coating to capture an image through the transflective coating, the image including a plurality of pixels corresponding to each of the array of pixel sensors;
   a processor capable of:
      receiving the image captured by the imager;
      determining correction data for each pixel as a function of a location of the corresponding pixel sensor within the array of pixel sensors; and
      correcting color values for each pixel of the image captured based on the correction data for that pixel to correct for radial color distortion caused by the transflective coating.

8. The monitoring system of claim 7, wherein the processor determines the correction data for each pixel by accessing a look-up table.

9. The monitoring system of claim 8, wherein the look-up table has correction data for each pixel in the array of pixel sensors.

10. The monitoring system of claim 9, wherein the correction data stored in the look-up table is determined by calibration whereby image samples of a flat, white, well illuminated scene are captured with and without the transflective coating present in front of the imager, ratios between each of the color channels between the with- and without-coatings image samples represent the radial color distortion of the transflective coating itself.

11. The monitoring system of claim 8, wherein the processor determines the correction data for each pixel by calculating an angle-of-incidence for each pixel location in the captured image and looking up the correction coefficients in the look-up table.

12. The monitoring system of claim 11, wherein the processor is located in the rearview assembly.

13. The monitoring system of claim 7, wherein the processor correcting color values for each pixel of the image captured by multiplying red, green, and blue coefficients of the correction data with red, green, and blue values of the pixel.

14. The monitoring system of claim 7, and further comprising a rearview assembly comprising an electro-optic element, wherein the transflective coating is part of the electro-optic element and the image sensor is located in the rearview assembly.

15. A method of correcting for radial color distortion in an image captured by an imager comprising an array of pixel sensors and positioned behind a transflective coating to capture an image through the transflective coating, the image including a plurality of pixels corresponding to each of the array of pixel sensors, the method is performed by a processor and comprises:
   receiving the image captured by the imager;
   determining correction data for each pixel as a function of a location of the corresponding pixel sensor within the array of pixel sensors; and
   correcting color values for each pixel of the image captured based on the correction data for that pixel to correct for radial color distortion caused by the transflective coating.

16. The method of claim 15, wherein the step of determining correction data includes accessing a look-up table.

17. The method of claim 16, wherein the look-up table includes correction data for each corresponding pixel sensor in the array of pixel sensors.

18. The method of claim 17, wherein the correction data stored in the look-up table is determined by calibration whereby image samples of a flat, white, well illuminated scene are captured with and without the transflective coating present in front of the imager, ratios between each of the color channels between the with- and without-coatings image samples represent the radial color distortion of the transflective coating itself.

19. The method of claim 16, wherein the look-up table includes correction data in the form of correction coefficients indexed by one of an angle-of-incidence and a radial distance from an optical center of the array of pixel sensors.

20. The method of claim 16, wherein the step of correcting color values for each pixel of the image captured includes calculating the angle-of-incidence for each pixel location in the captured image, looking up the correction coefficients in the look-up table based on the angle-of-incidence, and correcting color values for each pixel of the image captured by multiplying red, green, and blue coefficients of the correction data with red, green, and blue values of the pixel.

* * * * *